3,767,733
BENZO-(1',3',2')-DIOXAPHOSPHOLES
Lothar G. Dulog, Sint-Martens-Latem, and Sylvain A. R. Dewaele, Evergem, Belgium, assignors to S.A. Texaco Belgium N.V., Brussels, Belgium
No Drawing. Filed Sept. 30, 1971, Ser. No. 185,387
Int. Cl. C07f 9/08, 9/14, 9/24
U.S. Cl. 260—937   4 Claims

ABSTRACT OF THE DISCLOSURE

Phosphorus derivatives of o-dihydroxybenzenes effective as lubricant additives are defined by the formula:

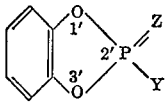

wherein Z represents oxygen or sulfur or may be absent; Y represents NHR or $NR_2$, where R is alkyl having up to 30 carbons in the chain or aryl or aralkyl having up to 22 carbons. The compounds are useful in lubricating compositions when present therein in an amount ranging from about 0.01 to 50 percent by weight of the composition.

---

This invention relates to novel derivatives of o-dihydroxybenzenes which find utility as lubricant additives in lubricating oils and to lubricating compositions containing such compounds.

The compounds of the invention can be represented by the following general formula:

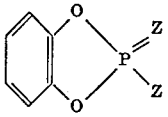

wherein Z represents oxygen or sulfur or may be absent; Y represents NHR or $NR_2$, where R is a straight chained or branched alkyl group having up to 30 carbon atoms in the chain; or aryl or aralkyl having up to 22 carbon atoms in the ring.

The compounds are prepared by the following reaction:

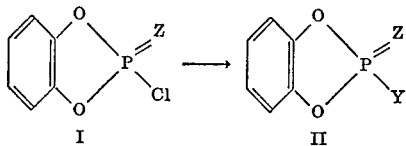

The starting material where Z is absent is prepared from catechol and $PCl_3$ according to the procedure given in J. Chem. Soc., 1958, 4250. The starting material where Z is oxygen is prepared from catechol, $PCl_5$ and acetone according to the method given in Chem. Ber., 99, 2631 (1966). The starting material where Z is sulfur is prepared from the first-named compound according to the method of Ber. Dtsch. Chem. Gesellsch., 61, 1264 (1928).

The preparative procedures differ slightly as regards the kind of solvents used and are illustrated below by referring to the synthesis of specific compounds. The physical properties of the compounds are given in Tables I–III below.

Lubricating compositions according to the invention comprise a lubricating agent such as a mineral oil or a grease to which has been added from 0.01 to 50 percent by weight of at least one compound of the invention.

PROCEDURE 1

Preparation of 2'-amino-benzo-(1',3',2'-dioxaphospholes)

174.5 g. (1 mole) 2'-chloro-benzo-(1',3',2'-dioxaphosphole) (Formula I with Z absent) is dissolved in 1 liter of dry benzene at room temperature in a flask protected from moisture by a $CaCl_2$ tube and provided with a stirrer, a dropping funnel and a gas inlet for dry nitrogen gas. To this solution is added 2 moles of a primary or a secondary amine (Method A) or a mixture of 1 mole of a primary or a secondary amine and 1 mole of a tertiary amine [1] (Method B) at such a rate that the temperature of the mixture does not rise over 30–40° C. After addition of all the amine the mixture is stirred at room temperature for 3 hours whereafter the formed precipitate is filtered off. The solvent is evaporated from the filtrate leaving the desired product as a slightly yellow oil or as a white solid. The product can be purified either by distillation under reduced pressure or by recrystallization from benzene-hexane mixtures (see Table I).

PROCEDURE 2

Preparation of 2'-amino-2'-oxo-benzo-(1',3',2'-dioxaphospholes)

The procedure is the same as Procedure 1 except that the starting material, 2'-chloro-2'-oxo-benzo-(1',3',2'-dioxaphosphole) (Formula I with Z=0) was dissolved in 3.2 liters of dry diethyl-ether per mole instead of benzene as in Procedure 1. The results are summarized in Table II.

PROCEDURE 3

Preparation of 2'-amino-2'-thio-benzo-(1',3',2'-dioxaphospholes)

The procedure is the same as Procedure 1 except that the starting material, 2'-chloro-2'-thio-benzo-(1',3',2'-dioxaphosphole) (Formula I with Z=S) is dissolved in a

TABLE I.—PREPARATION OF 2'-AMINO-BENZO-(1',3',2'-DIOXAPHOSPHOLES)

(Procedure 1)

| –NR₂ | Method of preparation [1] | Yield, percent | B.P. (° C.)/mm. Hg |
|---|---|---|---|
| n-C₃H₇NH | A | 80.5 | 62/0.1 |
| n-C₁₂H₂₅NH | B | 73 | 110/0.5 |
| Primene 81-R [2] | B | 70 | |
| p-C₁₂H₂₅C₆H₄NH | B | 89.5 | |
| (n-C₃H₇)₂N | A | 60 | 100/0.4 |

[1] Method A: 2 moles of amine R₂NH per mole or starting material are used. Method B: 1 mole of amine R₂NH and 1 mole of Et₃N per mole of starting material are used.
[2] Primene 81–R is an (N-tert.-alkylamino) group.

mixture of 2.5 liters diethylether and 0.8 liter benzene per mole. The results are summarized in Table III.

---

[1] The tertiary amine used was triethylene (Et₃N). Pyridine and other tertiary amines can be used as well.

TABLE II.—PREPARATION OF 2'-AMINO-2'-OXO-BENZO (1',3',2'-DIOXAPHOSPHOLES)

(Procedure 2)

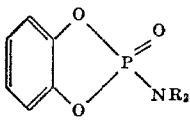

| NR₂ | Method of preparation¹ | Yield, percent | M.P. (° C.) | B.P. (° C.)/mm. Hg |
|---|---|---|---|---|
| n-C₃H₇NH | A | 66.6 | 86–88 | 165/2 |
| n-C₁₂H₂₅NH | A | 80 | 48–51 | 205/1 |
| Primene 81-R | B | 83 | | |
| C₆H₅NH | A | 77 | | 110/0.9 |
| p-C₁₂H₂₅C₆H₄NH | B | 100 | | 215–217/0.9 |
| (n-C₃H₇)₂N | A | 73 | 44 | 135/1 |
| (n-C₁₂H₂₅)₂N | B | 100 | | |

¹ Method A: 2 moles of amine, R₂NH, per mole of starting material are used. Method B: 1 mole of amine, R₂NH, and 1 mole of Et₃N per mole of starting material are used.

TABLE III.—PREPARATION OF 2'-AMINO-2'-THIO-BENZO-(1'3',2'-DIOXAPHOSPHOLES)

(Procedure 3)

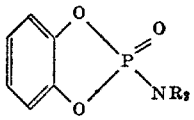

| NR₂ | Method of preparation¹ | Yield, percent | M.P. (° C.) | B.P. (° C.)/mm. Hg |
|---|---|---|---|---|
| n-C₃H₇NH | A | 86 | | 162/0.9 |
| n-C₁₂H₂₅NH | A | 65 | | 200–210/1 |
| Primene 81-R | B ² | 100 | | |
| C₆H₅NH | A | 60 | | 162–165/1.9 |
| p-C₁₂H₂₅C₆H₄NH | B | 70 | | 230/1.1 |
| (n-C₃H₇)₂N | A | 88.8 | | 170/1 |
| CH₃—⟨ ⟩—NH | A | 50 | 96–97 | 193/1.5 |

¹ Method A: 2 moles of amine R₂NH per mole of starting material are used. Method B: 1 mole of amine R₂NH and 1 mole of Et₃N per mole of starting material are used.
² The reaction mixture had to be refluxed for 3 to 6 hours.

The compounds of the invention were tested for their lubricating properties by the Navy Wear Test and by the Rotary Bomb Oxidation Test, as was a commercially used lubricating oil additive, TLA 111 (zinc dithiophosphate). The Rotary Bomb Test is the well-known ASTM 2272 test. The higher the value obtained the better the anti-oxidant properties of the sample. The Navy Wear Test is designed for the study of anti-wear properties of lubricants under controlled temperatures, moderate pressures and constant speeds. In this test, steel balls of 0.5" diameter are cleaned, dried and locked in position in a test cup. A charge of 10 to 15 cc. of the lubricant is then put in the cup. Separate runs of 10, 40, 70 and 100 minutes duration are then conducted at a speed of 1,800 r.p.m. on the four-ball wear tester. The test load is 28 kg. at room temperature. The wear in terms of microns per minute is calculated from the average scar diameter (mm.) as follows:

$$\text{Wear in microns/min.} = \frac{\Sigma d - \Sigma n}{\Sigma t}(1000)$$

where $d = d_{10} + d_{40} + d_{70} + d_{100}$ = scar diameter at each time period
$h$ = Hertz diameter (0.265 mm.)
$h$ for the four-period separate runs = $4h$
$t$ = time of run in minutes
$\Sigma t$ for the four-period runs = 220 min.

The tests are repeated with the additives to be tested. Additives are considered beneficial with respect to anti-wear properties with a result up to 3 microns per minute, fair from 3 to 7 microns.

TABLE IV.—BENCH TESTS 2 PERCENT BY WEIGHT OF COMPOUNDS IN 145 P PALE TURBINE OIL

| | | Navy wear test (µ/min.) | Rotary bomb oxidation test (min.) |
|---|---|---|---|
| 1 | ⟨benzo⟩P—NHC₁₂H₂₅ | 2.5 | 95 |
| 2 | ⟨benzo⟩P—NHC₆H₄C₁₂H₂₅ | 3.0 | >360 |
| 3 | ⟨benzo⟩P—NH Primene 81-R | 1.4 | 25 |
| 4 | ⟨benzo⟩P=NH Primene 81-R | 1.4 | 40 |
| 5 | ⟨benzo⟩P—N(C₃H₇)₂ | 2.6 | 45 |
| 6 | 145 pale turbine oil | 6.6 | 20 |
| 7 | TLA 111 (zinc dithiophosphate) | 2.6 | 210 |

As shown in Table IV, the compounds of the invention which were tested gave nearly equal or better results in the Navy Wear Test than did the commercial additive TLA 111. In both that test and in the Rotary Bomb Oxidation Test the subject compounds improved the lubricating properties of the oil to which they had been added.

While the invention has been illustrated with reference to specific compounds in which the benzenoid moiety is unsubstituted it will be understood by those skilled in this art that fully equivalent compounds can have one or more lower alkyl, haloalkyl, halo and similar substituents on the benzene ring.

What is claimed is:
1. A compound of the formula:

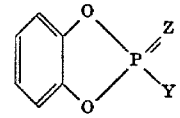

wherein Z represents oxygen, or sulfur or may be absent; Y represents NHR or NR₂ where R is alkyl having up to 30 carbon atoms in the chain or aryl or aralkyl having up to 22 carbon atoms.

2. The compound according to claim 1 wherein Z is absent and Y is n-C₃H₇NH, n-C₁₂H₂₅NH, p-C₁₂H₂₅C₆H₄NH or (n-C₃H₇)₂N 3. The compound according to claim 1 wherein Z is oxygen and Y is n-C₃H₇NH, n-C₁₂H₂₅NH, C₆H₅NH, p-C₁₂H₂₅C₆H₄NH, (n-C₃H₇)₂N, or (n-C₁₂H₂₅)₂N.

4. The compound according to claim 1 wherein Z is sulfur and Y is n-$C_3H_7$NH, n-$C_{12}H_{25}$NH, $C_6H_5$NH, p-$C_{12}H_{25}C_6H_4$NH, (n-$C_3H_7)_2$N, or
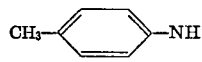
References Cited
UNITED STATES PATENTS
| | | | |
|---|---|---|---|
| 3,327,024 | 6/1967 | De Young et al. | 260—937 X |
| 3,459,835 | 8/1969 | Dever et al. | 260—937 X |
| 3,531,549 | 9/1970 | Randall | 260—937 X |
| 3,632,690 | 1/1972 | Dever et al. | 260—937 |
| 3,522,331 | 7/1970 | Dever | 260—937 |
| 3,639,536 | 2/1972 | Muramoto | 260—937 |
LEWIS GOTTS, Primary Examiner
R. L. RAYMOND, Assistant Examiner
U.S. Cl. X.R.
252—47.5, 49.9; 260—984